United States Patent
Wu et al.

(10) Patent No.: US 11,308,702 B2
(45) Date of Patent: Apr. 19, 2022

(54) METHOD AND APPARATUS FOR DISPLAYING AN IMAGE, ELECTRONIC DEVICE AND COMPUTER-READABLE STORAGE MEDIUM

(71) Applicant: Beijing Xiaomi Mobile Software Co., Ltd., Beijing (CN)

(72) Inventors: Huixia Wu, Beijing (CN); Qian Wang, Beijing (CN)

(73) Assignee: Beijing Xiaomi Mobile Software Co., Ltd., Beijing (CN)

( * ) Notice: Subject to any disclaimer, the term of this patent is extended or adjusted under 35 U.S.C. 154(b) by 0 days.

(21) Appl. No.: 16/953,937

(22) Filed: Nov. 20, 2020

(65) Prior Publication Data

US 2021/0375051 A1 Dec. 2, 2021

(30) Foreign Application Priority Data

May 29, 2020 (CN) .......................... 202010478138.8

(51) Int. Cl.
  *G06T 19/00* (2011.01)
  *H04N 5/232* (2006.01)
  *H04N 5/247* (2006.01)

(52) U.S. Cl.
  CPC ....... *G06T 19/006* (2013.01); *H04N 5/23299* (2018.08); *H04N 5/247* (2013.01)

(58) Field of Classification Search
  None
  See application file for complete search history.

(56) References Cited

U.S. PATENT DOCUMENTS

| | | | |
|---|---|---|---|
| 10,504,003 B1 * | 12/2019 | Flowers | G06K 9/00718 |
| 2007/0050397 A1 * | 3/2007 | Hokimoto | G06F 16/41 |
| 2007/0064813 A1 | 3/2007 | Fanfelle | |
| 2009/0244296 A1 | 10/2009 | Petrescu et al. | |
| 2017/0255941 A1 * | 9/2017 | Chandrasekaran | G06F 21/32 |
| 2018/0364884 A1 * | 12/2018 | Qian | G06F 3/011 |
| 2020/0154095 A1 * | 5/2020 | Fleischman | H04N 5/232933 |
| 2021/0084347 A1 * | 3/2021 | Chen | H04N 21/2187 |

OTHER PUBLICATIONS

Extended European Search Report in European Application No. 20208663.3, dated May 10, 2021.
The Best Dual Camera App: MixCam, retrieved from https://fueled.com/blog/du al-camera-app/, Apr. 28, 2021.
The Ultimate Guide to Animoji (+How to Use It on All iPhones & Androids), Oct. 22, 2019, retrieved from https://learn.g2.com/tag/tech.

* cited by examiner

*Primary Examiner* — Frank S Chen

(74) *Attorney, Agent, or Firm* — Finnegan, Henderson, Farabow, Garrett & Dunner, L.L.P.

(57) ABSTRACT

A method for displaying an image is applied to an electronic device including a first camera and a second camera. The method includes: acquiring a first real-time image collected by the first camera and a second real-time image collected by the second camera, the first real-time image being different from the second real-time image; determining a target object in the first real-time image; generating a real-time virtual image corresponding to the target object; and displaying the real-time virtual image on the second real-time image.

18 Claims, 7 Drawing Sheets

METHOD AND APPARATUS FOR DISPLAYING AN IMAGE, ELECTRONIC DEVICE AND COMPUTER-READABLE STORAGE MEDIUM

CROSS REFERENCE TO RELATED APPLICATION

This application is based upon and claims priority to Chinese Patent Application No. 202010478138.8, filed on May 29, 2020, the disclosure of which is hereby incorporated by reference in its entirety.

TECHNICAL FIELD

The present disclosure relates generally to display technologies, and more specifically to a method for displaying an image, an apparatus for displaying an image, and a computer-readable storage medium.

BACKGROUND

Conventionally, augmented reality (AR) technology can display virtual images on images of real scenes. When AR is used in combination with an electronic device such as a mobile phone, an image of a real scene can be captured through a camera on the electronic device, and then a virtual image pre-stored in the electronic device is displayed on the captured image of the real scene.

In the conventional augmented reality (AR) technology, the electronic device is required to store the virtual image in advance. Accordingly, it is inconvenient for a user of the electronic device to display the virtual image in the real scene.

SUMMARY

According to a first aspect of embodiments of the present disclosure, a method for displaying an image is provided. The method is applied to an electronic device including a first camera and a second camera. The method includes: acquiring a first real-time image collected by the first camera and a second real-time image collected by the second camera, the first real-time image being different from the second real-time image; determining a target object in the first real-time image; generating a real-time virtual image corresponding to the target object; and superimposing and displaying the real-time virtual image on the second real-time image.

According to a second aspect of embodiments of the present disclosure, an electronic device is provided. The electronic device includes: a first camera and a second camera; a processor; and a memory for storing instructions executable by the processor. The processor is configured to acquire a first real-time image collected by the first camera and a second real-time image collected by the second camera, the first real-time image being different from the second real-time image; determine a target object in the first real-time image; generate a real-time virtual image corresponding to the target object; and superimpose and display the real-time virtual image on the second real-time image.

According to a third aspect of embodiments of the present disclosure, a non-transitory computer-readable storage medium is provided. The non-transitory computer-readable storage medium has stored thereon instructions that, when executed by a processor of an electronic device including a first camera and a second camera, cause the electronic device to perform a method for displaying an image, including: acquiring a first real-time image collected by the first camera and a second real-time image collected by the second camera, the first real-time image being different from the second real-time image; determining a target object in the first real-time image; generating a real-time virtual image corresponding to the target object; and superimposing and displaying the real-time virtual image on the second real-time image.

BRIEF DESCRIPTION OF THE DRAWINGS

The accompanying drawings, which are incorporated in and constitute a part of this disclosure, illustrate embodiments consistent with the present disclosure and, together with the description, serve to explain the principles of the present disclosure.

DETAILED DESCRIPTION

Reference will now be made in detail to exemplary embodiments, examples of which are illustrated in the accompanying drawings. The following description refers to the accompanying drawings in which the same numbers in different drawings represent the same or similar elements unless otherwise represented. The implementations set forth in the following description of exemplary embodiments do not represent all implementations consistent with the present disclosure. Instead, they are merely examples of apparatuses and methods consistent with aspects related to the present disclosure as recited in the appended claims.

Figure 1:
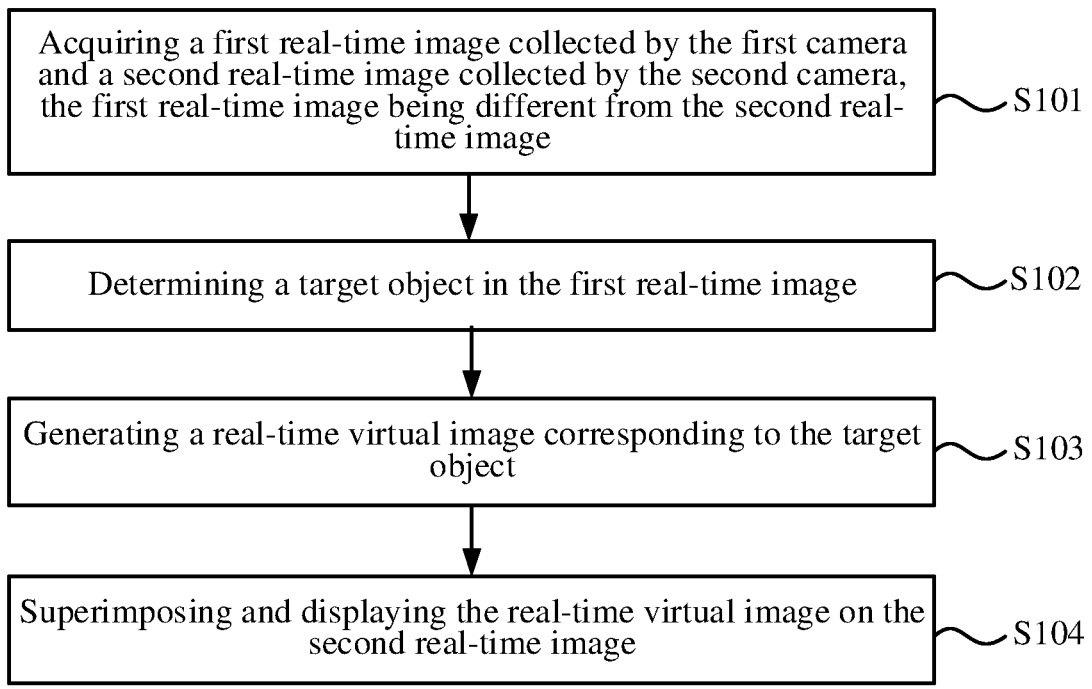
FIG. 1 is a flowchart of a method for displaying an image according to some embodiments of the present disclosure.

FIG. 1 is a flowchart of a method for displaying an image according to some embodiments of the present disclosure. The method may be applied to an electronic device. The electronic device may include a first camera and a second camera. In addition to the first camera and the second camera, the electronic device may also include other cameras. The first camera and the second camera may be any two different cameras in the electronic device, rather than two specific cameras in the electronic device.

The electronic device includes but is not limited to, for example, a mobile phone, a tablet computer, and a wearable device. Take the electronic device being a mobile phone as an example, the first camera may be arranged in a frame area outside the screen of the mobile phone; or arranged under the screen of the mobile phone to collect images through the screen of the mobile phone, thereby realizing an all screen.

The first camera may be one camera or a camera group composed of several cameras. A first real-time image collected in the following embodiments may be collected by the one camera or by the camera group. The second camera may be one camera or a camera group composed of several cameras. A second real-time image collected in the following embodiments may be collected by the one camera or by the camera group.

As illustrated in FIG. 1, the method for displaying an image may include the following steps.

At block S101, a first real-time image collected by the first camera and a second real-time image collected by the second camera are obtained. The first real-time image is different from the second real-time image.

At block S102, a target object in the first real-time image is determined.

At block S103, a real-time virtual image corresponding to the target object is generated.

At block S104, the real-time virtual image is superimposed and displayed on the second real-time image.

It should be noted that the cameras that collect the first real-time image and the second real-time image may be exchanged as needed, that is, the first real-time image may be collected by the second camera, and the second real-time image may be collected by the first camera, which may be configured according to practical requirements.

In some embodiments, shooting directions of the first camera and the second camera may be different, so that by collecting images in different directions, the first real-time image and the second real-time image, which are different, may be obtained. For example, the first camera is a front camera, and the second camera is a rear camera. The first camera may collect an image in front of the electronic device and determine the image as the first real-time image, and the second camera may collect an image at the back of the electronic device and determine the image as the second real-time image.

In some embodiments, the shooting directions of the first camera and the second camera may be the same, but shooting ranges are different. For example, the first camera and the second camera are both rear cameras of the electronic device, where the first camera is located in the upper left corner of the back cover of the electronic device, and the second camera is located in the upper right corner of the back cover of the electronic device. The first camera may capture an image of an upper left area relative to the back of the electronic device as the first real-time image, and the second camera may capture an image of an upper right area relative to the back of the electronic device as the second real-time image, thereby obtaining the first real-time image and second real-time image that are different.

The following embodiments are described by taking the first camera being a front camera and the second camera being a rear camera as an example.

In some embodiments, the front camera and the rear camera may be turned on at the same time. The manufacturer of the electronic device may set the underlying logic of the electronic device based on hardware in advance, so that images may be collected by the front camera and the rear camera at the same time. Furthermore, two cameras are used to capture images at the same time. The front camera may capture an image of a first side (that is, the front side of the electronic device) consistent with a light emission direction of the screen, and the rear camera may capture an image of a second side (that is, the back side of the electronic device) opposite to the light emission direction of the screen.

After the first real-time image is collected, the target object may be determined from the first real-time image. A type of the target object may be set as required. For example, the target object may be a person or an object. If the target object is a person, the target object may be a part of the human body, such as an arm, a leg, etc., or a complete human body.

A model for recognizing a specific type of object may be obtained through machine learning training in advance. The first real-time image may be input into the model to recognize a target object of a specific type in the first real-time image.

And then, the real-time virtual image corresponding to the target object may be generated. The real-time virtual image may be a two-dimensional image or a three-dimensional image, which may be set as required.

As an example, the real-time virtual image is a three-dimensional image. An action of a user may be machine-learned based on an action following algorithm, so as to build a model that may convert a two-dimensional image of the user into a three-dimensional image. Consequently, the target object in the first real-time image may be converted based on the model built. For example, a limb joint of the target object may be determined, and then an anchor point may be added to the limb joint. The two-dimensional image of the target object may be converted into a virtual three-dimensional image based on the movement of the anchor point, thereby generating the real-time virtual image of the target object, that is, the virtual three-dimensional image may follow the target object to perform actions.

In a case where the target object includes the face of the user, facial feature recognition technology may be adopted to recognize a facial feature of the target object. The virtual image corresponding to the face may be generated based on the recognized facial feature, and determined as a facial part in the real-time virtual image.

In addition, when the virtual image is a two-dimensional image, the model obtained by machine learning may also be used to generate the real-time virtual image corresponding to the target object.

In addition to the above-mentioned action following algorithm, the two-dimensional image of the target object may also be converted into the virtual three-dimensional image in other ways. For example, a DIB-R rendering framework (a differentiable interpolation-based renderer) may be created. DIB-R uses an encoder-decoder architecture (a neural network that converts an input into a feature map or a vector for predicting specific information such as shape, color, texture, and lighting) to generate a three-dimensional image. The two-dimensional image of the target object may be inputted into the rendering framework to output a corresponding virtual three-dimensional image.

In some embodiments, images are simultaneously collected by the first camera and the second camera, and the real-time virtual image of the target object collected by the first camera is displayed in the second real-time image collected by the second camera. The real-time virtual image is generated in real time based on the target object in the first real-time image, and the second real-time image may be a real scene. Consequently, superimposing and displaying the real-time virtual image on the second real-time image does not require pre-storing virtual images that need to be displayed in real scenes. A user may shoot a desired target object in real time as needed, and then a corresponding real-time virtual image may be generated, such that the virtual image may be displayed in the real scene flexibly.

It should be noted that a depth at which the real-time virtual image is superimposed and displayed on the second real-time image may be set as required. For example, if the target object is the user, the user may take a selfie through the front camera, and shoot the real scene through the rear camera, so as to generate a virtual image of himself/herself. The generated virtual image may replicate actions of the user in the real scene, and thus the virtual image of the user may be displayed in the real scene. The virtual image of the user captured in real time may be automatically applied to the real scene captured in real time. In this manner, superimposing and displaying a plurality of frames of real-time virtual images on a plurality of frames of corresponding second real-time images may display a video showing the virtual image in a reality image. Actions displayed in the virtual image are consistent with actions of the user in the real scene. On the one hand, the virtual image shows actions consistent with those of the user, and on the other hand, the virtual image may be displayed with an environment where the user is in used as a background, so as to flexibly realize AR display. For example, on the basis, vlog and AR virtual image teaching may be carried out as actions of the user may be displayed through a virtual image and presented to the audience in the form of AR.

In some embodiments, the real-time virtual image is a three-dimensional image or a two-dimensional image. For example, the virtual image generated based on the target object may be a three-dimensional image or a two-dimensional image, which may be set as required.

Figure 2:
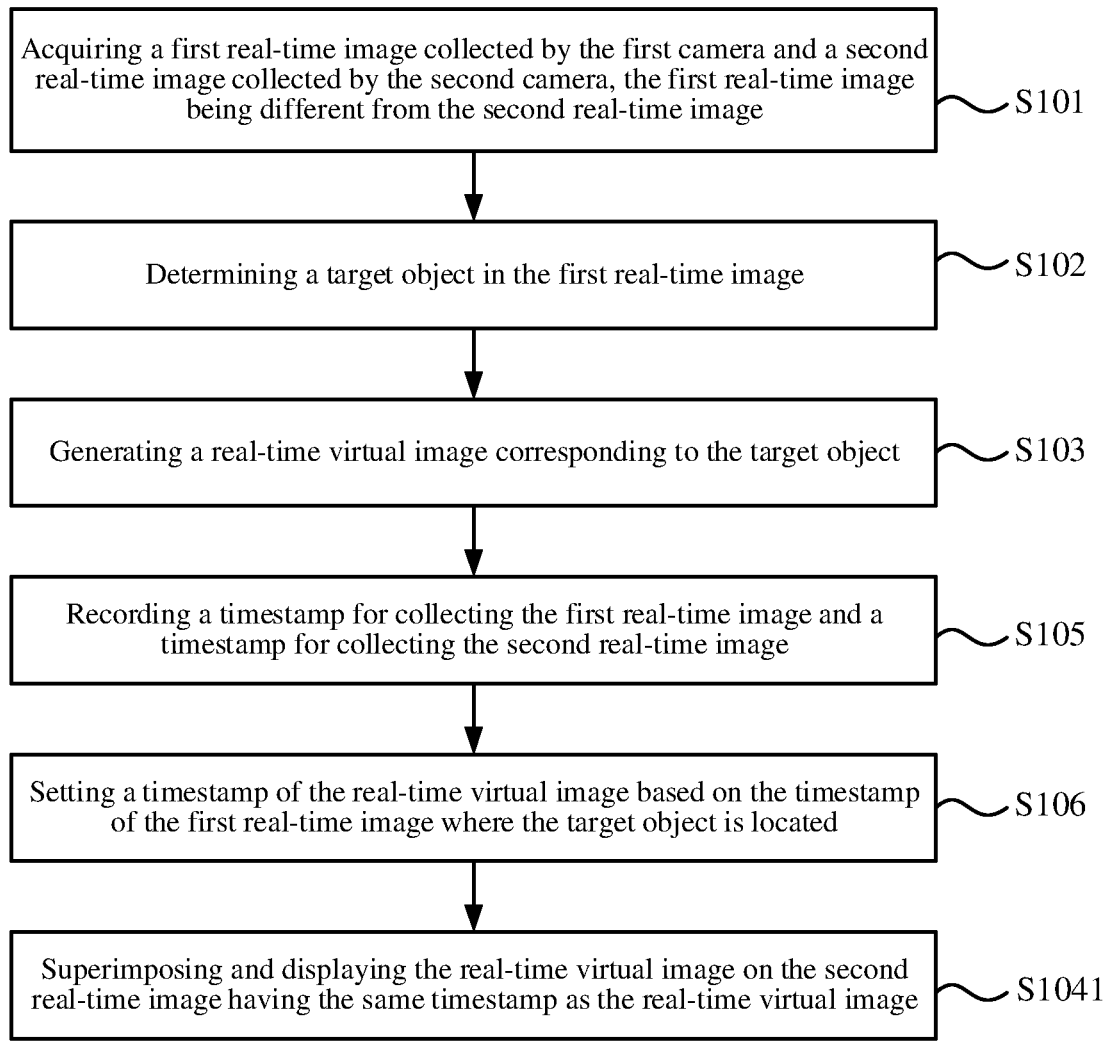
FIG. 2 is a flowchart of a method for displaying an image according to some other embodiments of the present disclosure.

FIG. 2 is a flowchart of a method for displaying an image according to some other embodiments of the present disclosure. As illustrated in FIG. 2, before superimposing and displaying the real-time virtual image on the second real-time image, the method further includes the following steps.

At block S105, a timestamp for collecting the first real-time image and a timestamp for collecting the second real-time image are recorded.

In some embodiments, when two or more first real-time images are obtained by the first camera and/or two or more second real-time images are obtained by the second camera, the timestamp for collecting each of the first real-time images and the timestamp for collecting each of the second real-time images is recorded.

At block S106, a timestamp for the real-time virtual image is set based on the timestamp of the first real-time image where the target object is located.

Accordingly, superimposing and displaying the real-time virtual image on the second real-time image includes the following step.

At block S1041, the real-time virtual image is superimposed and displayed on the second real-time image having the same timestamp as the real-time virtual image.

In some embodiments, the timestamp of collecting the first real-time image and the timestamp of collecting the second real-time image are recorded, and then the timestamp of the real-time virtual image may be set based on the timestamp of the first real-time image where the target object is located, so that the timestamp of the real-time virtual image is identical to the timestamp of the first real-time image where the target object is located. The real-time virtual image is superimposed and displayed on the second real-time image having the same timestamp as the real-time virtual image, so that the real-time virtual image displayed in the second real-time image corresponds to the target object in the first real-time image captured at the same time as the second real-time image.

Figure 3:
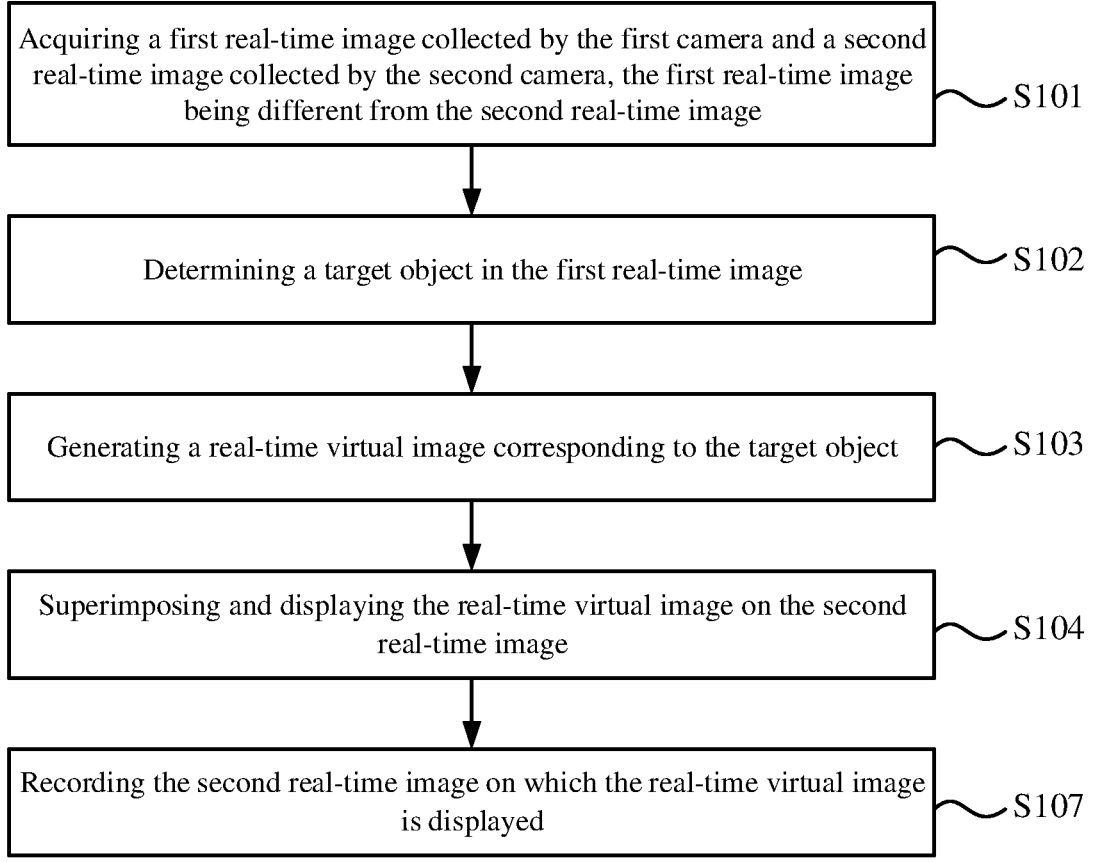
FIG. 3 is a flowchart of a method for displaying an image according to some other embodiments of the present disclosure.

FIG. 3 is a flowchart of a method for displaying an image according to some other embodiments of the present disclosure. As illustrated in FIG. 3, the method further includes the following step.

At block S107, the second real-time image displaying the real-time virtual image is recorded.

In some embodiments, since the second real-time image may be used as a reality image, and the real-time virtual image may be displayed in the second image as a virtual image, a plurality of second real-time images displaying the real-time virtual image may constitute an AR video, so that the second real-time images displaying the real-time virtual image may be recorded as an AR video (or, some frames of the second real-time images displaying the real-time virtual image may be recorded as AR images). The AR video may be stored for subsequent use by users. For example, the AR video may be used as a vlog, an AR virtual image teaching video.

In some embodiments, the first camera may be a front camera, and the second camera may be a rear camera. The front camera may capture an image of a first side (that is, the front side of the electronic device) consistent with a light emission direction of the screen, and the rear camera may capture an image of a second side (that is, the back side of the electronic device) opposite to the light emission direction of the screen, so that the first real-time image and the second real-time image which are different may be obtained.

In some embodiments, the first camera may be a front camera or a rear camera, and the second camera is a rotatable camera. For example, the second camera may be a telescopic camera, which may be extended from and retracted to the frame of the electronic device. When the second camera is extended from the frame, the second camera may be rotated with an extension direction as the axis. For example, a rotatable structure is provided on the electronic device. The second camera may be located on the structure. For another example, the structure may be the front cover of a mobile phone, and the front cover may be flipped. The second camera may be located on the front cover and flipped together with the front cover.

For example, when the first camera is a front camera, the second camera may be rotated toward the back side of the electronic device to capture an image at the back of the electronic device, or the second camera may be rotated toward a lateral side (the side that is connected to the front and the back of the electronic device) of the electronic device to capture an image of the lateral side of the electronic device. When the first camera is a rear camera, the second camera may be rotated toward the front side of the electronic device to capture an image of the front of the electronic device, or the second camera may be rotated toward a lateral side (the side that is connected to the front and the back of the electronic device) of the electronic device to capture an image of the lateral side of the electronic device.

Corresponding to the foregoing embodiments of the method for displaying an image, various embodiments of the present disclosure provide examples of an apparatus for displaying an image.

Figure 4:
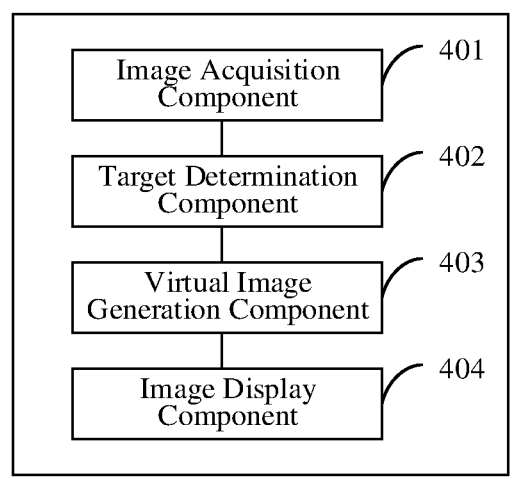
FIG. 4 is a block diagram of an apparatus for displaying an image according to some embodiments of the present disclosure.

FIG. 4 is a block diagram of an apparatus for displaying an image according to some embodiments of the present disclosure. The apparatus for displaying an image according to the embodiment may be applied to an electronic device. The electronic device may include the first camera and the second camera. In addition to the first camera and the second camera, the electronic device may also include other cameras. The first camera and the second camera may be any two different cameras in the electronic device, rather than two specific cameras in the electronic device. The electronic device includes but is not limited to, for example, a mobile phone, a tablet computer, and a wearable device. Take the electronic device being a mobile phone as an example, the first camera may be arranged in a frame area outside the screen of the mobile phone; or arranged under the screen of the mobile phone to collect images through the screen of the mobile phone, thereby realizing an all screen.

The first camera may be one camera or several cameras. The first real-time image collected in the following embodiments may be collected by the one camera or by the several cameras. The second camera may be one camera or several cameras. The second real-time image collected in the following embodiments may be collected by the one camera or by the several cameras.

As illustrated in FIG. 4, the apparatus for displaying an image may include an image acquisition component 401, a target determination component 402, a virtual image generation component 403, and an image display component 404.

The image acquisition component 401 is configured to obtain a first real-time image collected by the first camera and a second real-time image collected by the second camera, the first real-time image being different from the second real-time image. The target determination component 402 is configured to determine a target object in the first real-time image. The virtual image generation component 403 is configured to generate a real-time virtual image corresponding to the target object. The image display component 404 is configured to superimpose and display the real-time virtual image on the second real-time image.

In some embodiments, the real-time virtual image is a three-dimensional image or a two-dimensional image.

Figure 5:
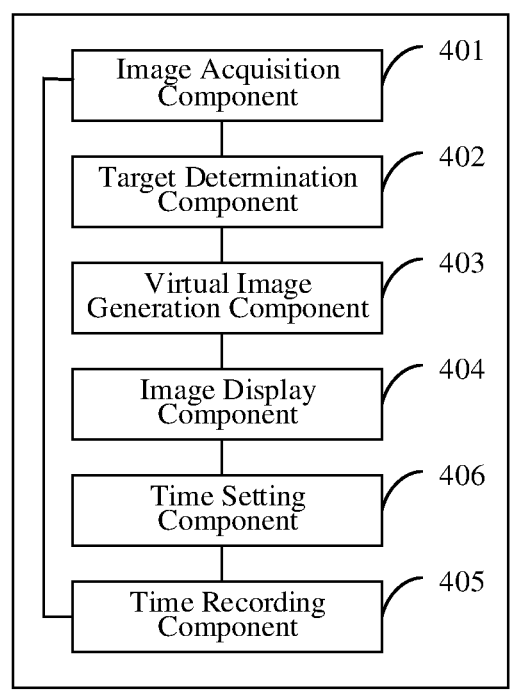
FIG. 5 is a block diagram of an apparatus for displaying an image according to some other embodiments of the present disclosure.

FIG. 5 is a block diagram of an apparatus for displaying an image according to some other embodiments of the present disclosure. As illustrated in FIG. 5, the apparatus further includes a time recording component 405 and a time setting component 406.

The time recording component 405 is configured to record a timestamp for collecting the first real-time image and a timestamp for collecting the second real-time image. In some embodiments, when two or more first real-time images are obtained by the first camera and/or two or more second real-time images are obtained by the second camera, time recording component 405 is configured to record the timestamp for collecting each of the first real-time images and the timestamp for collecting each of the second real-time images.

The time setting component 406 is configured to set a timestamp of the real-time virtual image based on the timestamp of the first real-time image where the target object is located.

The image display component 404 is configured to superimpose and display the real-time virtual image on the second real-time image having the same timestamp as the real-time virtual image.

Figure 6:
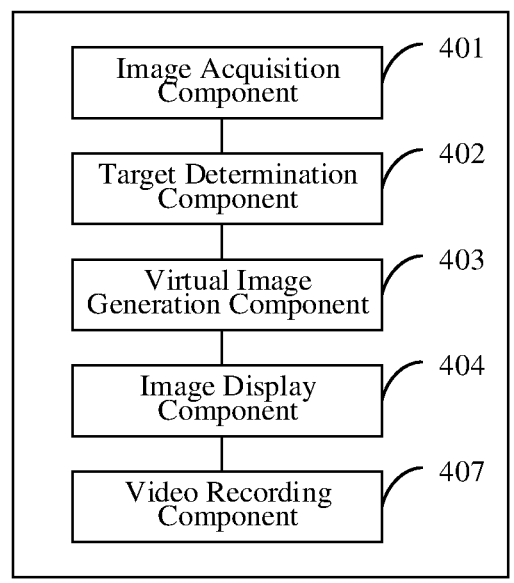
FIG. 6 is a block diagram of an apparatus for displaying an image according to some other embodiments of the present disclosure.

FIG. 6 is a block diagram of an apparatus for displaying an image according to some other embodiments of the present disclosure. As illustrated in FIG. 6, the apparatus further includes a video recording component 407.

The video recording component 407 is configured to record the second real-time image displaying the real-time virtual image.

In some embodiments, the first camera is a front camera, and the second camera is a rear camera.

In some embodiments, the first camera is a front camera or a rear camera, and the second camera is a rotatable camera.

Regarding the apparatus according to the foregoing embodiments, the specific manner in which each component performs operations has been described in detail in embodiments of the method, and thus detailed description will not be repeated here.

Since the apparatus embodiments correspond to method embodiments, reference may be made to the description of the method embodiments. The apparatus embodiments described above are merely illustrative. The components illustrated as separate components can be or not be separated physically, and components described as components can be located at one place, or can be distributed onto several networks. Some or all of the components may be selected according to practical needs.

Embodiments of the present disclosure further provide an electronic device. The electronic device includes a processor configured to perform the method described above.

Embodiments of the present disclosure further provide a non-transitory computer-readable storage medium having stored thereon instructions that, when executed by a processor of a device, cause the device to perform the method described above.

Figure 7:
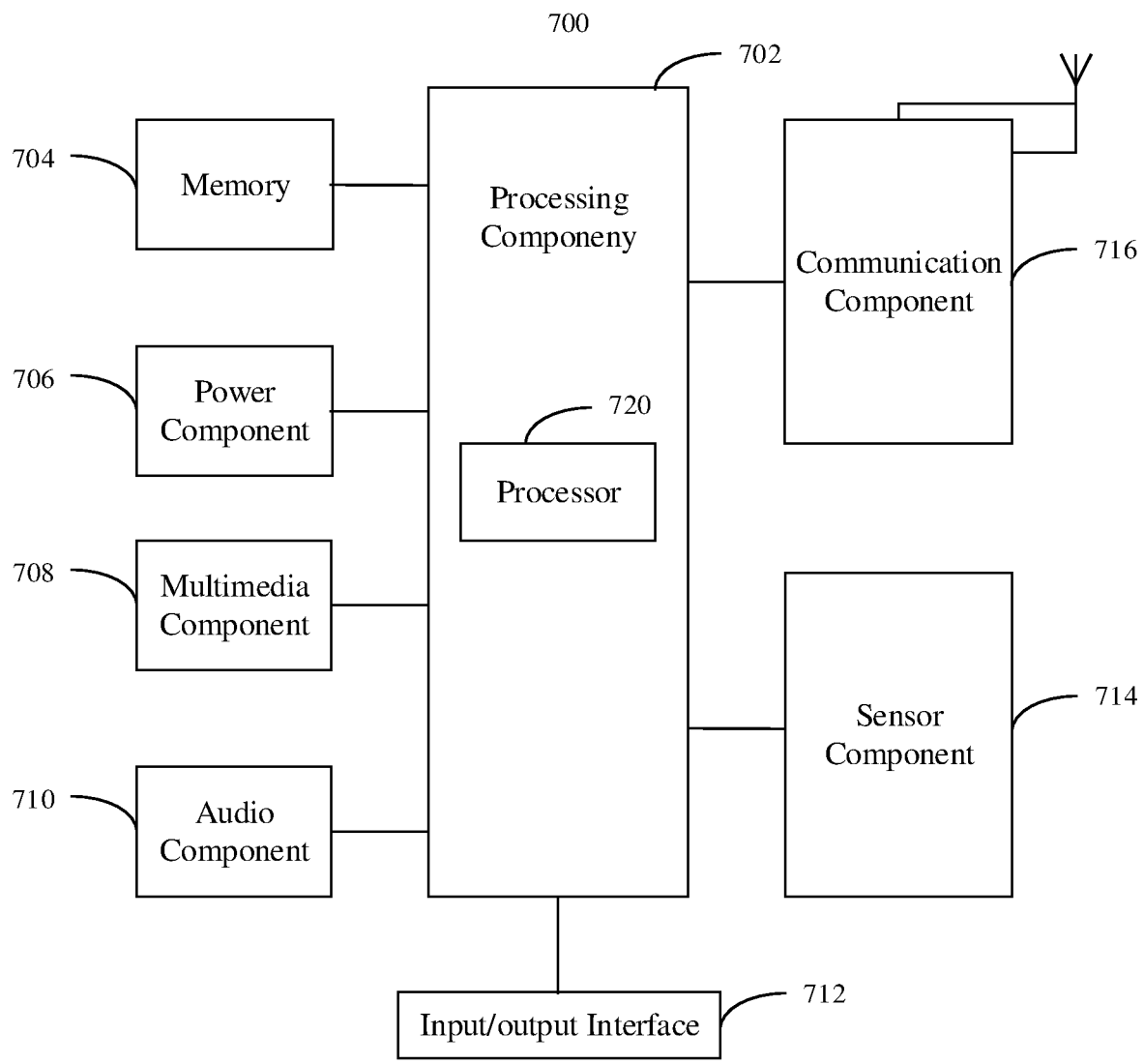
FIG. 7 is a block diagram of an apparatus for image display according to some embodiments of the present disclosure.

FIG. 7 is a block diagram of an apparatus 700 for image display according to some embodiments of the present disclosure. For example, the apparatus 700 may be an electronic device such as a mobile phone, a computer, a digital broadcast terminal, a messaging device, a game console, a tablet device, a medical device, an exercise device, a personal digital assistant, and so on.

Referring to FIG. 7, the apparatus 700 may include one or more of the following components: a processing component 702, a memory 704, a power component 706, a multimedia component 708, an audio component 710, an input/output (I/O) interface 712, a sensor component 714, and a communication component 716.

The processing component 702 normally controls the overall operation (such as operations associated with displaying, telephone calls, data communications, camera operations and recording operations) of the apparatus 700. The processing component 702 may include one or a plurality of processors 720 to execute instructions so as to perform all or part of the steps of the above described method. In addition, the processing component 702 may include one or a plurality of units to facilitate interactions between the processing component 702 and other components. For example, the processing component 702 may include a multimedia unit to facilitate interactions between the multimedia component 708 and the processing component 702.

The memory 704 is configured to store various types of data to support operations at the apparatus 700. Examples of such data include instructions for any application or method operated on the apparatus 700, contact data, phone book data, messages, images, videos and the like. The memory 704 may be realized by any type of volatile or non-volatile storage devices, or a combination thereof, such as a static random access memory (SRAM), an electrically erasable programmable read only memory (EEPROM), an erasable programmable read only memory (EPROM), a programmable read only memory (PROM), a read only memory (ROM), a magnetic memory, a flash memory, a disk or an optical disk.

The power component 706 provides power to various components of the apparatus 700. The power component 706 may include a power management system, one or a plurality of power sources and other components associated with power generation, management, and distribution of the apparatus 700.

The multimedia component 708 includes a screen that provides an output interface between the apparatus 700 and the user. In some embodiments, the screen may include a liquid crystal display (LCD) and a touch panel (TP). In some embodiments, organic light-emitting diode (OLED) displays can be employed. If the screen includes a touch panel, the screen may be implemented as a touch screen to receive input signals from the user. The touch panel includes one or a plurality of touch sensors to sense touches, slides, and gestures on the touch panel. The touch sensor may sense not only the boundary of the touches or sliding actions, but also the duration and pressure related to the touches or sliding operations. In some embodiments, the multimedia component 708 includes a first camera and/or a second camera. When the apparatus 700 is in an operation mode such as a shooting mode or a video mode, the first camera and/or the second camera may receive external multimedia data. Each first camera and second camera may be a fixed optical lens system or have a focal length and an optical zoom capability.

The audio component 710 is configured to output and/or input an audio signal. For example, the audio component 710 includes a microphone (MIC) that is configured to receive an external audio signal when the apparatus 700 is in an operation mode such as a call mode, a recording mode, and a voice recognition mode. The received audio signal may be further stored in the memory 704 or transmitted via the communication component 716. In some embodiments, the audio component 710 further includes a speaker for outputting audio signals.

The I/O interface 712 provides an interface between the processing component 702 and a peripheral interface unit. The peripheral interface unit may be a keyboard, a click wheel, a button and so on. These buttons may include, but are not limited to, a home button, a volume button, a start button, and a locking button.

The sensor assembly 714 includes one or a plurality of sensors for providing the apparatus 700 with various aspects of status assessments. For example, the sensor component 714 may detect an ON/OFF state of the apparatus 700 and a relative positioning of the components. For example, the components may be a display and a keypad of the apparatus 700. The sensor component 714 may also detect a change in position of the apparatus 700 or a component of the apparatus 700, the presence or absence of contact of the user with the apparatus 700, the orientation or acceleration/deceleration of the apparatus 700 and a temperature change of the apparatus 700. The sensor component 714 may include a proximity sensor configured to detect the presence of nearby objects without any physical contact. The sensor component 714 may also include a light sensor (such as a CMOS or a CCD image sensor) for use in imaging applications. In some embodiments, the sensor component 714 may further include an acceleration sensor, a gyro sensor, a magnetic sensor, a pressure sensor, or a temperature sensor.

The communication component 716 is configured to facilitate wired or wireless communication between the apparatus 700 and other devices. The apparatus 700 may access a wireless network based on a communication standard such as WiFi, 4G or 5G, or a combination thereof. In an exemplary embodiment, the communication component 716 receives broadcast signals or broadcast-associated information from an external broadcast management system via a broadcast channel In an exemplary embodiment, the communication component 716 further includes a near field communication (NFC) component to facilitate short range communication. In an exemplary embodiment, the communication component 716 may be implemented based on radio frequency identification (RFID) technology, infrared data association (IrDA) technology, ultra-wideband (UWB) technology, Bluetooth (BT) technology and other technologies.

In an exemplary embodiment, the apparatus 700 may be implemented by one or more of application specific integrated circuits (ASICs), digital signal processors (DSPs), digital signal processing devices (DSPDs), programmable logic devices (PLDs), field programmable gate arrays (FPGA), controllers, microcontrollers, microprocessors, or other electronic components, so as to perform the above method.

In an exemplary embodiment, there is also provided a non-transitory computer readable storage medium including instructions, such as the memory 704 including instructions. The instructions are executable by the processor 720 of the apparatus 700 to perform the above method. For example, the non-transitory computer readable storage medium may be a ROM, a random access memory (RAM), a CD-ROM, a magnetic tape, a floppy disk, an optical data storage device, etc.

According to embodiments of the present disclosure, images may be simultaneously collected by the first camera and the second camera, and the real-time virtual image of the target object collected by the first camera is displayed in the second real-time image collected by the second camera. The real-time virtual image is generated in real time based on the target object in the first real-time image, and the second real-time image may be a real scene. Consequently, displaying the real-time virtual image on the second real-time image does not require pre-storing virtual images that need to be displayed in real scenes. A user may shoot a desired target object in real time as needed, and then a corresponding real-time virtual image may be generated, such that the virtual image may be displayed in the real scene flexibly.

Other embodiments of the present disclosure will be apparent to those skilled in the art after considering the specification and practicing the present disclosure disclosed herein. The present disclosure is intended to cover any variations, uses or adaptive changes of the present disclosure, which are in accordance with general principles of the present disclosure and include common knowledge or technical means in the art that are not disclosed herein. The specification and embodiments are exemplary only, and the real scope and spirit of the present disclosure are indicated in the appended claims.

It should be understood that the present disclosure is not limited to the precise structures described above and illustrated in the drawings, and various modifications and changes may be made without departing from the scope thereof. The scope of the present disclosure is limited by the appended claims.

What is claimed is:

1. A method for displaying an image, applied to an electronic device comprising a first camera and a second camera, the method comprising:
    acquiring a first real-time image collected by the first camera and a second real-time image collected by the second camera, the first real-time image being different from the second real-time image;
    determining a target object in the first real-time image;
    generating a real-time virtual image corresponding to the target object; and superimposing and displaying the real-time virtual image on the second real-time image, wherein when the target object is a user of the electronic device, the method further comprises:

determining a limb joint of the target object and adding an anchor point to the limb joint; and converting a two-dimensional image of the target object into a virtual three-dimensional image based on a movement of the anchor point to generate the real-time virtual image of the target object, thereby to replicate actions of the user in a real scene and display the real-time virtual image in the second real-time image corresponding to the real scene.

2. The method of claim 1, further comprising:

recording a timestamp for collecting the first real-time image and a timestamp for collecting the second real-time image; and setting a timestamp of the real-time virtual image based on the timestamp of the first real-time image where the target object is located;

wherein the superimposing and displaying the real-time virtual image on the second real-time image comprises:

superimposing and displaying the real-time virtual image on the second real-time image having the same timestamp as the real-time virtual image.

3. The method of claim 1, further comprising:

recording the second real-time image on which the real-time virtual image is displayed.

4. The method of claim 1, wherein the real-time virtual image is a three-dimensional image or a two-dimensional image.

5. The method of claim 1, wherein the first camera is a front camera, and the second camera is a rear camera.

6. The method of claim 1, wherein the first camera is a front camera or a rear camera, and the second camera is a rotatable camera, wherein the rotatable camera comprises a telescopic camera for being extended from and retracted to a frame of the electronic device, and when the telescopic camera is extended from the frame, the telescopic camera is rotated with an extension direction as an axis.

7. An electronic device, comprising:

a first camera and a second camera;

a processor; and a memory for storing instructions executable by the processor, wherein the processor is configured to:

acquire a first real-time image collected by the first camera and a second real-time image collected by the second camera, the first real-time image being different from the second real-time image;

determine a target object in the first real-time image;

generate a real-time virtual image corresponding to the target object; and superimpose and display the real-time virtual image on the second real-time image, wherein when the target object is a user of the electronic device, the processor is further configured to:

determine a limb joint of the target object and add an anchor point to the limb joint; and convert a two-dimensional image of the target object into a virtual three-dimensional image based on a movement of the anchor point to generate the real-time virtual image of the target object, thereby to replicate actions of the user in a real scene and display the real-time virtual image in the second real-time image corresponding to the real scene.

8. The electronic device of claim 7, wherein the processor is further configured to:

record a timestamp for collecting the first real-time image and a timestamp for collecting the second real-time image; and set a timestamp of the real-time virtual image based on the timestamp of the first real-time image where the target object is located;

wherein in superimposing and displaying the real-time virtual image on the second real-time image, the processor is further configured to:

superimpose and display the real-time virtual image on the second real-time image having the same timestamp as the real-time virtual image.

9. The electronic device of claim 7, wherein the processor is further configured to:

record the second real-time image on which the real-time virtual image is displayed.

10. The electronic device of claim 7, wherein the real-time virtual image is a three-dimensional image or a two-dimensional image.

11. The electronic device of claim 7, wherein the first camera is a front camera, and the second camera is a rear camera.

12. The electronic device of claim 7, wherein the first camera is a front camera or a rear camera, and the second camera is a rotatable camera, wherein the rotatable camera comprises a telescopic camera for being extended from and retracted to a frame of the electronic device, and when the telescopic camera is extended from the frame, the telescopic camera is rotated with an extension direction as an axis.

13. A non-transitory computer-readable storage medium having stored thereon instructions that, when executed by a processor of an electronic device comprising a first camera and a second camera, cause the electronic device to perform a method for displaying an image, the method comprising:

acquiring a first real-time image collected by the first camera and a second real-time image collected by the second camera, the first real-time image being different from the second real-time image;

determining a target object in the first real-time image;

generating a real-time virtual image corresponding to the target object; and superimposing and displaying the real-time virtual image on the second real-time image, wherein when the target object is a user of the electronic device, the method further comprises:

determining a limb joint of the target object and adding an anchor point to the limb joint; and converting a two-dimensional image of the target object into a virtual three-dimensional image based on a movement of the anchor point to generate the real-time virtual image of the target object, thereby to replicate actions of the user in a real scene and display the real-time virtual image in the second real-time image corresponding to the real scene.

14. The non-transitory computer-readable storage medium of claim 13, the method further comprising:

recording a timestamp for collecting the first real-time image and a timestamp for collecting the second real-time image; and setting a timestamp of the real-time virtual image based on the timestamp of the first real-time image where the target object is located;

wherein superimposing and displaying the real-time virtual image on the second real-time image comprises:

superimposing and displaying the real-time virtual image on the second real-time image having the same time-stamp as the real-time virtual image.

15. The non-transitory computer-readable storage medium of claim 13, the method further comprising:
recording the second real-time image on which the real-time virtual image is displayed.

16. The non-transitory computer-readable storage medium of claim 13, wherein the real-time virtual image is a three-dimensional image or a two-dimensional image.

17. The non-transitory computer-readable storage medium of claim 13, wherein the first camera is a front camera, and the second camera is a rear camera.

18. The non-transitory computer-readable storage medium of claim 13, wherein the first camera is a front camera or a rear camera, and the second camera is a rotatable camera,
wherein the rotatable camera comprises a telescopic camera for being extended from and retracted to a frame of the electronic device, and when the telescopic camera is extended from the frame, the telescopic camera is rotated with an extension direction as an axis.

* * * * *